United States Patent [19]
Piniot

[11] 3,871,681
[45] Mar. 18, 1975

[54] VEHICLE SUSPENSION DEVICE CAPABLE OF CORRECTING THE TRIM OF THE VEHICLE

[75] Inventor: Daniel Piniot, Saint-Germain, France

[73] Assignees: Automobiles Peugeot, Paris; Regie Nationale des Usines Renault, Boulogne-Billancourt, both of, France

[22] Filed: Jan. 7, 1974

[21] Appl. No.: 431,309

[30] Foreign Application Priority Data
Jan. 31, 1973 France .............................. 73.03342

[52] U.S. Cl. ............................ 280/124 F, 267/22
[51] Int. Cl. .............................................. B60g 3/00
[58] Field of Search ............ 280/124 F; 267/DIG. 1, 267/DIG. 2, 22, 34

[56] References Cited
UNITED STATES PATENTS
3,332,677 7/1967 Long ............................. 267/DIG. 1
3,628,810 12/1971 Graef ............................. 280/124 F Primary Examiner—Philip Goodman
Attorney, Agent, or Firm—Burns, Doane, Swecker & Mathis

[57] ABSTRACT

The suspension device comprises at least one suspending-damping assembly having a coil spring and a damper. A trim-correcting cylinder device is arranged in series with the damper between the suspended part of the vehicle and the wheel of the vehicle. The damper has a cylinder which carries the piston of the trim-correcting cylinder device.

The suspension device enables compensating for the lowering effect of high loads on the vehicle and enables adapting the same suspension for various models of the same basic vehicle.

9 Claims, 3 Drawing Figures

VEHICLE SUSPENSION DEVICE CAPABLE OF CORRECTING THE TRIM OF THE VEHICLE

The present invention relates to suspension devices for automobile vehicles. More precisely, it concerns such devices of the type comprising at least one supporting-damping assembly interposed between the suspended part and a wheel and consisting of a hydraulic damper disposed within a coil spring.

Devices automatically correcting the trim are known which are associated with hydraulic or pneumatic suspensions. Although these arrangements are satisfactory from the technical point of view they are unfortunately expensive and usually require the use of a pump which operates permanently and consumes an appreciable amount of energy. Also, such arrangements are usually not applied to light vehicles since they would increase the price thereof excessively.

Now certain light vehicles may have a high ratio between the suspended mass under load and the suspended mass under no load. This is in particular the case with utility or commercial type vehicles whose rear supporting elements may be subjected to relatively high variations in the load. In this case, either it is necessary to accept a large variation in the trim between the extreme conditions of utilisation which, apart from questions of appearance and difficulties in practice, requires means for correcting the angle of elevation of the headlights or the use of a firm and therefore uncomfortable suspension.

It has been proposed to interpose between the spring, constituting the supporting element, and the body a hydraulic cylinder which can be inflated to a variable extent in accordance with the load so as to compensate for the compression of the spring, but the adoption of this cylinder no longer permits employing supporting-damping assemblies in which the movements are identical for a basic vehicle and for a utility vehicle derived therefrom and this increases the manufacturing cost.

An object of the present invention is to provide a trim correcting device which is cheap and associated with a supporting-damping element of the suspension of the vehicle and permits interchangeability, for a given vehicle model, with no other modifications, between a supporting-damping element devoid of a corrector and a supporting-damping element which has such a corrector.

The invention provides a suspension device of the aforementioned type wherein the damper is disposed in series with a hydraulic cylinder whose system is constituted by or carried by the cylinder of the damper.

Further features and advantages of the invention will be apparent from the ensuing description with reference to the accompanying drawings.

In the drawings:

FIG. 3 is a partial view of a modification.

Figure 1:
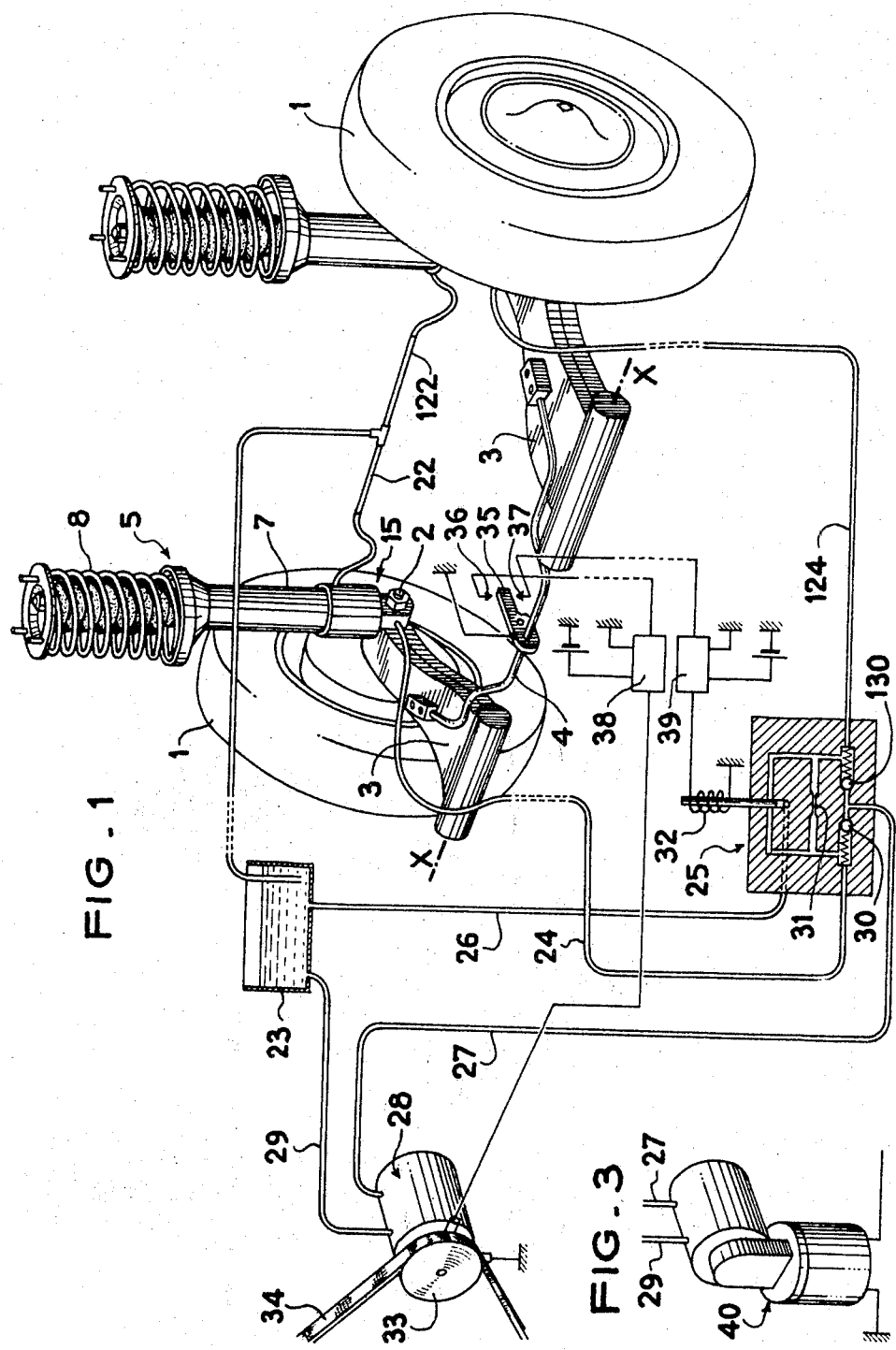
FIG. 1 is a diagrammatic view of a rear suspension provided with a trim correcting device according to the invention.

In the rear set of wheels shown in FIG. 1 each wheel 1 is mounted on a stub-axle 2 fixed to one end of a suspension arm 3 which is mounted at its other end under the floor of the vehicle (not shown) to pivot about an axis X—X which is substantially transverse with respect to the direction of movement of the vehicle.

The two arms 3 are interconnected by an antiroll bar 4.

The suspension comprises support-damping assemblies 5 disposed between each wheel stub-axle and the body 6.

Figure 2:
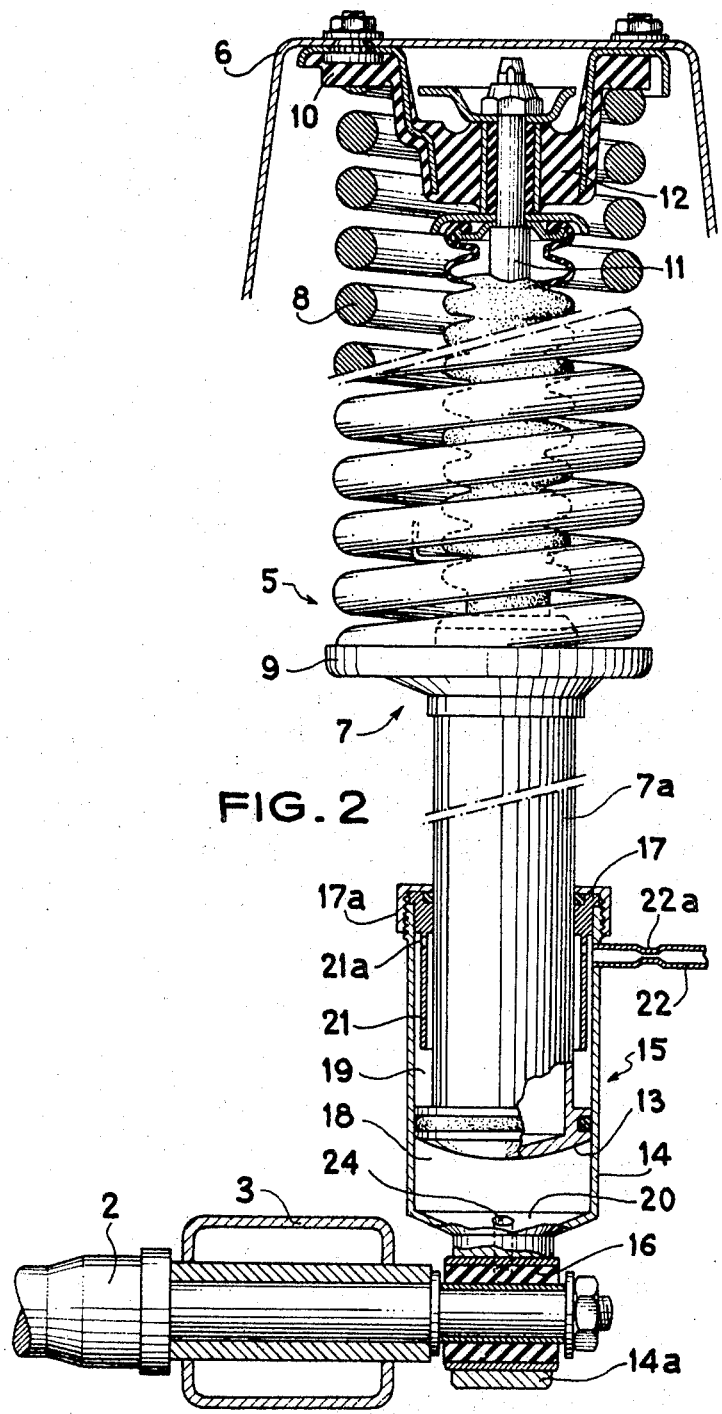
FIG. 2 is a partial sectional view of the supporting-damping device affording a trim correction according to the invention.

The sub-assembly 5 shown in FIG. 2 comprises mainly a hydraulic damper 7 disposed within a coil spring 8. The latter is disposed between a cup 9 integral with the body 7a of the damper 7 and an upper support 10 secured to the body 6. The rod 11 of the damper system is secured by resiliently yieldable connecting means 12 to the upper support 10.

In known constructions of this type, it is the base of the body or cylinder of the damper which is secured to the wheel stub-axle 2 (or to the arm 3).

According to the invention, the base of the body of the damper comprises an enlarged portion 13 constituting a piston which co-operates with a cylinder 14 so as to constitute a trim correcting cylinder device 15. The lower part of the body or cylinder 14 comprises an eye portion 14a which enables it to be mounted on the stub-axle 2 with a resiliently yieldable pivotal connection 16. The upper part of the cylinder 14 is closed by a plug 17 constituting a fluidtight guiding bearing for the body of the damper 7. This plug is locked in position by a cap 17a which is screwed on a screwthreaded part of the cylinder 14. The piston 13 divides the cylinder 14 into a lower chamber 18 and upper chamber 19.

The movements of the piston 13 with respect to the cylinder 14 are limited, downwardly, by abutment with the end 20 of the cylinder 14 and upwardly by abutment with the free edge of a skirt portion 21 depending from the plug 17. This skirt portion comprises in its upper part, in the neighbourhood of the plug, orifices 21a. The two confronting surfaces of the piston and end 20 are preferably of spherical dome shape.

The upper chamber 19 is connected by a conduit 22, having a restriction 22a, to the lower part of a liquid tank 23 exposed to atmospheric pressure, whereas the lower chamber 18 is connected by a conduit 24 to a hydraulic control unit 25 as shown in FIG. 1. Reference numerals 122 and 124 designate conduits which are identical to the conduits 22 and 24 and pertain to the second supporting and damping assembly of the same set of wheels.

The hydraulic unit 25 is also connected by a conduit 26 to the tank 23 and by a conduit 27 to the delivery side of a pump 28 whose input side is connected by a conduit 29 to the tank 23. The hydraulic unit comprises two check-valves 30, 130 disposed between the conduit 27 and respectively the conduits 24 and 124, a balancing jet 31 connecting the conduits 34 and 134, and an electromagnetic valve 32 controlling the communication between the conduits 24 and 124 and the conduit 26. The pump 28 can be driven through an electromagnetic clutch in the known manner which is capable of mechanically connecting it to a pulley 33 driven by the engine (not shown) of the vehicle through a belt 34.

The electrically operated valve 32 or the pump 28 can be supplied with current, for example in the known manner by a level detector 35 secured to the middle of antiroll bar 4 so that the angular position of this level detector is representative of the mean height of the two suspensions of the considered set of wheels. The detector 35 constitutes a grounded moving contact which can electrically co-operate with either of two contacts 36 and 37 which are fixed with respect to the body and disposed on each side of the detector in the same vertical plane. The contact 36 supplies current through a timing device 38 to the pump 28 and the contact 37 supplies current through a timing device 39 to the electrically operated valve 32.

The invention just described operates in the following manner:

When the vehicle is employed with no load at the rear, the normal trim is achieved when the piston 13 is in abutment with the end of the cylinder 14. The level detector 35 occupies an intermediate position in which neither the pump 28 nor the valve 32 is supplied with current. Everything occurs as though the trim correcting device did not exist and the body of the damper 7 were directly secured to the stub-axle (or arm 3). The timing devices 38 and 39 preclude an accidental supply of current to the pump 28 and valve 22 when the vehicle moves as a result of unevenness of the road.

When the vehicle carries a load which brings about a marked crushing or compression of the rear suspension, the detector 25 closes the contact 36 which supplies current to the electromagnetic clutch of the pump 28. Liquid under pressure is then supplied by way of the conduits 24, 124 to the lower chambers 18 of the trim correcting cylinder devices and this has for effect to urge upwardly the supporting-damping assemblies until the switch formed by the contacts 35 and 36 is one more open.

Simultaneously, liquid is discharged by way of the conduits 22 and 122 of the upper cylinders 19 to the tank 23. The function of these upper chambers is double: on one hand, they recover leakages of oil between the piston 13 and cylinder 14 and, on the other hand, they preclude, upon release of the load, cavitation phenomenon in the lower chambers 18. The restriction 22a retards the flow of oil in the conduit 22.

The maximum rise of the suspension-damping assembly bringing the piston 13 into abutment against the skirt extension 21 of the plug 17 compensates for the compression of the spring 8 corresponding to maximum load.

When, inversely, the vehicle is completely or partially unloaded, the detector 35 closes the contact 37 and this supplies current to the electrically operated valve 33. A communication is then established between the conduits 24, 124 and the conduit 26 and liquid escapes from the lower chambers 18 by way of the conduits 24, 124, 26 to the tank 23 until the opening of the switch formed by the contacts 35 and 37.

Simultaneously, increase in the volume of the upper chambers 19, due to the descent of the piston 13, draws into these chambers 19 liquid coming from the tank 23 by way of the conduits 22, 122.

It can be seen that the object of the invention is achieved and that the supporting-damping assembly provided with the trim-correcting cylinder device can be constructed in a simple manner with the same dimensions and the same fixing means as another assembly which is intended for the same vehicle but does not have a trim-correcting cylinder device.

It will be observed that the means for driving the pump 28 has been shown merely by way of example and that exactly the same results are obtainable if the pump is driven by an electric motor 40 (FIG. 3) supplied under the same conditions as the electromagnetic clutch provided in the described embodiment.

It is also of interest to note that in the case of failure of the trim-correcting device, the vehicle is not immobilized and remains utilisable in the normal manner, only its trim being affected when the vehicle is under load.

It will be understood that many modifications may be made in the arrangement which has been illustrated and described by way of example both as concerns the construction of the damper-correcting cylinder device assembly and the hydraulic and electrical control means employed so that the correction is effected under the best conditions.

Having now described my invention what I claim as new and desire to secure by Letters Patent is:

1. A suspension device for a vehicle having a suspended part and a wheel, the device being capable of correcting the trim of the vehicle and comprising at least one suspending-damping assembly having a coil spring and a hydraulic damper interposed between the suspended part and the wheel of the vehicle and at least one trim-correcting cylinder device comprising a cylinder defining a chamber having an end and a piston movable in the chamber of the cylinder toward the end of the chamber, means for supplying pressurized fluid to said chamber between said piston and said end of said chamber, the cylinder device being arranged in series with the hydraulic damper between the suspended part and the wheel, the damper having a cylinder which terminates short of said end of said chamber and is movable toward said end of said chamber and carries the piston of the cylinder device, which piston extends across substantially the entire section of said chamber so as to be exposed to said pressurized fluid substantially throughout the section of said chamber.

2. A device as claimed in claim 1, wherein the cylinder of the damper has a first cylindrical portion and an end cylindrical portion which has an outside diameter that exceeds the outside diameter of the first cylindrical portion and defines the piston of the cylinder device.

3. A device as claimed in claim 1, comprising a support carrying the wheel, means for mounting the cylinder of the cylinder device on the support, and annular plug means interposed between the cylinder of the damper and the cylinder of the cylinder device so that the cylinder of the damper is slidable in the cylinder of the cylinder device in a sealed manner.

4. A suspension device for a vehicle having a suspended part and a wheel, the device being capable of correcting the trim of the vehicle and comprising at least one suspending-damping assembly having a coil spring and a hydraulic damper interposed between the suspended part and the wheel of the vehicle, at least one trim-correcting cylinder device comprising a cylinder defining a chamber having an end, and a piston movable in the chamber of the cylinder toward the end of the chamber, means for supplying pressurized fluid to said chamber between said piston and said end of said chamber, the cylinder device being arranged in series with the hydraulic damper between the suspended part and the wheel, the damper having a cylinder which terminates short of said end of said chamber and is movable toward said end of said chamber and carries the piston of the cylinder device, which piston extends across substantially the entire section of said chamber so as to be exposed to said pressurized fluid substantially throughout the section of said chamber, annular plug means interposed between the cylinder of the damper and the cylinder of the cylinder device so that the cylinder of the damper is slidable in the cylinder of the cylinder device in a sealed manner and the plug means having at least one abutment surface for limiting the travel of the cylinder of the damper in the course of extension of the cylinder device.

5. A device as claimed in claim 4, comprising a skirt portion extending from the plug means in an annular gap between the cylinder of the cylinder device and the cylinder of the damper, the skirt portion defining the abutment surface.

6. A suspension device for a vehicle having a suspended part and a wheel, the device being capable of correcting the trim of the vehicle and comprising at least one suspending-damping assembly having a coil spring and a hydraulic damper interposed between the suspended part and the wheel of the vehicle, at least one trim-correcting cylinder device comprising a cylinder defining a chamber having an end, and a piston movable in the chamber of the cylinder toward the end of the chamber, means for supplying pressurized fluid to said chamber between said piston and said end of said chamber, the cylinder device being arranged in series with the hydraulic damper between the suspended part and the wheel, the damper having a cylinder which terminates short of said end of said chamber and is movable toward said end of said chamber and carries the piston of the cylinder device, which piston extends across substantially the entire section of said chamber so as to be exposed to said pressurized fluid substantially throughout the section of said chamber, annular plug means interposed between the cylinder of the damper and the cylinder of the cylinder device so that the cylinder of the damper is slidable in the cylinder of the cylinder device in a sealed manner and a screwthreaded cap which locks the plug means in position on the cylinder of the cylinder device.

7. A suspension device for a vehicle having a suspended part and a wheel, the device being capable of correcting the trim of the vehicle and comprising at least one suspending-damping assembly having a coil spring and a hydraulic damper interposed between the suspended part and the wheel of the vehicle and at least one trim-correcting cylinder device comprising a cylinder and a piston movable in the cylinder, the cylinder device being arranged in series with the hydraulic damper between the suspended part and the wheel, the damper having a cylinder which carries the piston of the cylinder device, the piston defining with the cylinder of the cylinder device a bottom chamber and a top chamber at opposite ends of the piston, there being combined with the suspension device: a tank containing liquid, a liquid supply pump having a delivery passage, a vehicle level detector and means responsive to the level detector for connecting the bottom chamber selectively with the tank and with the pump in accordance with the level of the vehicle detected by the level detector, and a conduit having a restriction and connecting the top chamber to the tank.

8. A device as claimed in claim 7, wherein the pump is electrically actuated and said means responsive to the level detector comprise a check-valve, a first conduit connecting the delivery passage of the pump to the check-valve, valve means, a second conduit connecting the check-valve to the bottom chamber, a third conduit connecting the second conduit to the tank, electrically operated valve means controlling the third conduit to selectively open and close the third conduit, an electric circuit connected to actuate the valve and the pump, the level detector comprising switch means in said circuit for supplying current to the pump and closing the valve means when the level of the vehicle reaches a low value and interrupting supply of current to the pump and opening the valve means when the level of the vehicle reaches a high value, the switch means having an intermediate position corresponding to an intermediate level of the vehicle in which switch means position supply of current to the pump and valve means is interrupted, time delay means being inserted in said circuit to delay actuation of the pump and valve means by the switch means.

9. A device as claimed in claim 7, wherein the conduit connecting the top chamber to the tank communicates with the top chamber in the vicinity of the plug and the skirt portion has at least one orifice in the vicinity of the plug.

* * * * *